(12) United States Patent
Itou et al.

(10) Patent No.: US 7,408,312 B2
(45) Date of Patent: Aug. 5, 2008

(54) CONTROL DEVICE FOR PERMANENT MAGNET SYNCHRONOUS MOTOR

(75) Inventors: Nobuo Itou, Tokyo (JP); Keita Horii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 59 days.

(21) Appl. No.: 10/591,135

(22) PCT Filed: Mar. 24, 2004

(86) PCT No.: PCT/JP2004/004044

§ 371 (c)(1),
(2), (4) Date: Aug. 30, 2006

(87) PCT Pub. No.: WO2005/093942

PCT Pub. Date: Oct. 6, 2005

(65) Prior Publication Data

US 2007/0200528 A1    Aug. 30, 2007

(51) Int. Cl.
*H02P 21/00* (2006.01)
*H02P 25/00* (2006.01)
*G01R 31/34* (2006.01)

(52) U.S. Cl. .................. 318/254; 318/439; 318/138; 318/759

(58) Field of Classification Search ............... 318/138, 318/439, 254, 759
See application file for complete search history.

(56) References Cited

U.S. PATENT DOCUMENTS

| | | | | |
|---|---|---|---|---|
| 4,450,395 A | * | 5/1984 | Kawamura et al. | 318/700 |
| 5,459,386 A | * | 10/1995 | Okachi et al. | 318/727 |
| 5,569,995 A | * | 10/1996 | Kusaka et al. | 318/717 |
| 5,652,495 A | * | 7/1997 | Narazaki et al. | 318/716 |
| 5,689,166 A | * | 11/1997 | Nagayama et al. | 318/721 |
| 5,923,728 A | * | 7/1999 | Ikkai et al. | 318/807 |
| 5,936,378 A | * | 8/1999 | Iijima et al. | 318/807 |
| 6,194,864 B1 | * | 2/2001 | Kinpara et al. | 318/805 |
| 6,326,762 B1 | * | 12/2001 | Jiang et al. | 318/811 |
| 6,541,937 B2 | * | 4/2003 | Kato | 318/727 |
| 6,591,758 B2 | * | 7/2003 | Kumar | 105/35 |
| 6,700,400 B2 | * | 3/2004 | Atarashi | 324/772 |

(Continued)

FOREIGN PATENT DOCUMENTS

JP    5-137377 A    6/1993

(Continued)

*Primary Examiner*—Lincoln Donovan
*Assistant Examiner*—Eduardo Colon
(74) *Attorney, Agent, or Firm*—Sughrue Mion, PLLC

(57) ABSTRACT

A control device for a permanent magnet synchronous motor includes: an inverter 9 for converting inputted DC voltage into AC voltage of variable-voltage and variable-frequency, and driving a motor 14 with the AC voltage; a speed controller 22 for generating, in accordance with a speed instruction signal, a q-axis current component orthogonal to the magnetic field of the motor 14; a loss calculating means 50 for calculating a loss by summing a copper loss and an iron loss in the motor 14; a d-axis current generating means 52 for generating, in accordance with the value that is the motor's rated loss decreased by the loss, a d-axis current instruction signal to flow into the motor 14; and a resistor-on-judgment unit 58 for judging, from the DC voltage, whether or not the motor 14 operates in its recovery state and activating the d-axis current generator 52 while in the recovery state.

6 Claims, 6 Drawing Sheets

U.S. PATENT DOCUMENTS

| | | | |
|---|---|---|---|
| 6,965,212 B1* | 11/2005 | Wang et al. | 318/700 |
| 2002/0113615 A1* | 8/2002 | Atarashi | 324/772 |
| 2005/0285556 A1* | 12/2005 | Chen et al. | 318/432 |
| 2007/0278986 A1* | 12/2007 | Okamura | 318/798 |

FOREIGN PATENT DOCUMENTS

| | | |
|---|---|---|
| JP | 2001-95300 A | 4/2001 |
| JP | 2003-47300 A | 2/2003 |

\* cited by examiner

CONTROL DEVICE FOR PERMANENT MAGNET SYNCHRONOUS MOTOR

TECHNICAL FIELD

The present invention relates to control devices, for permanent magnet synchronous motors, that control, considering the motor's load conditions, so as to allow its recovering electric power to be consumed by the motor.

A conventional control device for permanent magnet synchronous motor has been disclosed in Japanese Patent Laid-Open No. 2001-95300 as follows; the control device includes an inverter for converting DC voltage to alternating current of variable voltage and variable frequency, a permanent magnet synchronous motor to which electricity is fed from the inverter, a speed control unit for generating a speed instruction signal, a speed controller for generating a torque instruction signal in order to make the motor's speed respond to the speed instruction signal, a q-axis current instructing unit for generating an instruction signal for a current component (a q-axis current component) orthogonal to the magnetic field of the motor, a d-axis current instructing unit for generating an instruction signal for a current component (a d-axis current component) with the same directionality as the magnetic field of the motor, and a unit for controlling the inverter in order to provide the motor with current responding to each of the instruction signals for the q-axis current component and the d-axis current component, so that the control device switches, in accordance with its powering state or recovery state, the instruction signal value of the d-axis current in the d-axis current instructing unit.

Because the conventional control device controls the current component (a d-axis current component) with the same directionality as the magnetic field of the motor, so as not to transfer electric power recovered in the permanent magnet synchronous motor to the DC voltage side of the inverter, it can curb DC voltage rising without using exclusive circuits, for consuming the recovering electric power, configured with resistors, switching devices, etc. As a result, the overall controlling system can be configured compactly and economically. Moreover, when the motor operates in the recovery state, the device can curb the DC voltage generated at the inverter input side so that recovering power generated in the motor can be consumed in itself, by generating, in accordance with its generating power, the current component (the d-axis current component) with the same directionality as the magnetic field of the motor, or by generating the component in accordance with DC voltage inputted into the inverter.

However, when the conventional control device for permanent magnet synchronous motor is operated without limiting d-axis current therethrough, there has been a problem in that an increasing copper loss in the motor makes its temperature exceed the allowable limit, resulting in the motor being overloaded.

DISCLOSURE OF INVENTION

The present invention has been made to solve the problems described above, and an objective of this invention is to provide a control device, for permanent magnet synchronous motors, that provides d-axis current determined from allowable power loss in the motor.

An aspect of a control device for a permanent magnet synchronous motor according to the present invention comprises: an inverter for converting input DC voltage into alternating current of variable voltage and variable frequency, and for driving the motor with the alternating current; a q-axis current instructing means for generating, in accordance with a speed instruction signal, an instruction signal for a q-axis component of the current, orthogonal to the magnetic field of the motor; a loss calculating means for calculating a loss that is the sum of the motor's copper loss and iron loss; a d-axis current generating means for generating, in accordance with the motor's rated loss decreased by the loss, an instruction signal for a d-axis current that is passed through the motor; a controlling means for judging, from the DC voltage, whether or not the motor is operating in a recovery state, and for activating the d-axis current generating means if the motor is in the recovery state.

In the present invention, because a loss being generated at this moment in the motor is calculated and the d-axis current is controlled to flow within a consumable value that is the rated loss decreased by the loss, the present invention brings effects of consuming recovering electric power in the motor while preventing the motor from being overloaded.

Another aspect of a control device for a permanent magnet synchronous motor according to the present invention comprises: an inverter for converting input DC voltage into alternating current of variable voltage and variable frequency, and for driving the motor with the alternating current; a q-axis current instructing means for generating, in accordance with a speed instruction signal, an instruction signal for a q-axis component of the current, orthogonal to the magnetic field of the motor; a d-axis current generating means for generating an instruction signal for a d-axis current with the same directionality as the magnetic field of the motor; a storage means for storing inputted values of the motor's winding resistance, field magnetic flux constant, and rated loss; a current detecting means for detecting current flowing in the motor, so as to generate a current detection signal; a position detecting means for detecting a rotational position of the motor, so as to generate a position detection signal; a calculating means for calculating, based on the current detection signal and the winding resistance, the motor's copper loss, and calculating, based on the position detection signal and the field magnetic flux constant, the motor's iron loss, so as to calculate a loss that is the sum of the copper loss and the iron loss; a d-axis current generating means for generating, based on the motor's rated loss decreased by the loss calculated by the calculating means, an instruction signal for the d-axis current; and a controlling means for judging, from the DC voltage, whether or not the motor is operating in a recovery state, and for activating the d-axis current generating means if the motor is in the recovery state.

In the present invention, because a loss being generated at this moment is calculated and the d-axis current is controlled to flow within a consumable value that is the rated loss decreased by the loss, the present invention brings effects of consuming recovering electric power in the motor while preventing the motor overload as well as allowing the loss being generated in the motor at this moment to be easily calculated.

Still another aspect of a control device for a permanent magnet synchronous motor according to the present invention comprises: an inverter for converting input DC voltage into alternating current of variable voltage and variable frequency, and for driving the motor with the alternating current; a q-axis current instructing means for generating, in accordance with a speed instruction signal, an instruction signal for a q-axis component of the current, orthogonal to the magnetic field of the motor; a d-axis current generating means for generating an instruction signal for a d-axis current with the same directionality as the magnetic field of the motor; a storage means for storing inputted values for the motor's winding resistance, field magnetic flux constant, rated loss, and thermal time constant; a current detecting means for detecting current flowing in the motor, so as to generate a current detection signal; a position detecting means for detecting rotational position of the motor, so as to generate a position detection signal; an iron loss calculating means for calculating, based on the current detection signal and the winding resistance, the motor's copper loss, and calculating, based on the position detection signal and the field magnetic flux constant, the motor's iron loss, so as to calculate a loss that is the sum of the copper loss and the iron loss; an estimating means for estimating temperature rise in the motor windings, based on the loss calculated by the loss calculating means, and on the thermal time constant; ad-axis current generating means for generating, in accordance with the estimated temperature rise, an instruction signal for flowing the d-axis current to the motor; and a controlling means for judging, from the DC voltage, whether or not the motor is operating in a recovery state, and for activating the d-axis current generating means if the motor is in the recovery state.

In the present invention, consumable d-axis current is calculated from an estimated temperature rise due to the motor's loss, in the motor windings so as to be applied to the motor. Therefore, the recovering electric power can be consumed inside the motor while curbing the temperature rise in the motor.

And it is preferred to provide the control device with a d-axis current limiting means that restricts the d-axis current instruction signal in accordance with the maximum current that the inverter can flow.

The above-mentioned configuration can prevent overloads in the inverter, because the d-axis current is controlled below the maximum current that the inverter can provide.

Furthermore, it is preferred to provide the control device with a recovery consumption means in which a resistor and a switching device are connected to the DC voltage, and an activating means that judges, whether or not the DC voltage exceeds a predetermined threshold value, and activates the switching device when it exceeds the value.

In the above configuration, when the recovering electric power cannot be completely consumed in the motor, the switching device is activated to consume the power in the resistor, which, therefore, brings effects that the capacities of the switching device and the resistor can be made small.

BEST MODE FOR CARRYING OUT THE INVENTION

Embodiment 1

Figure 1:
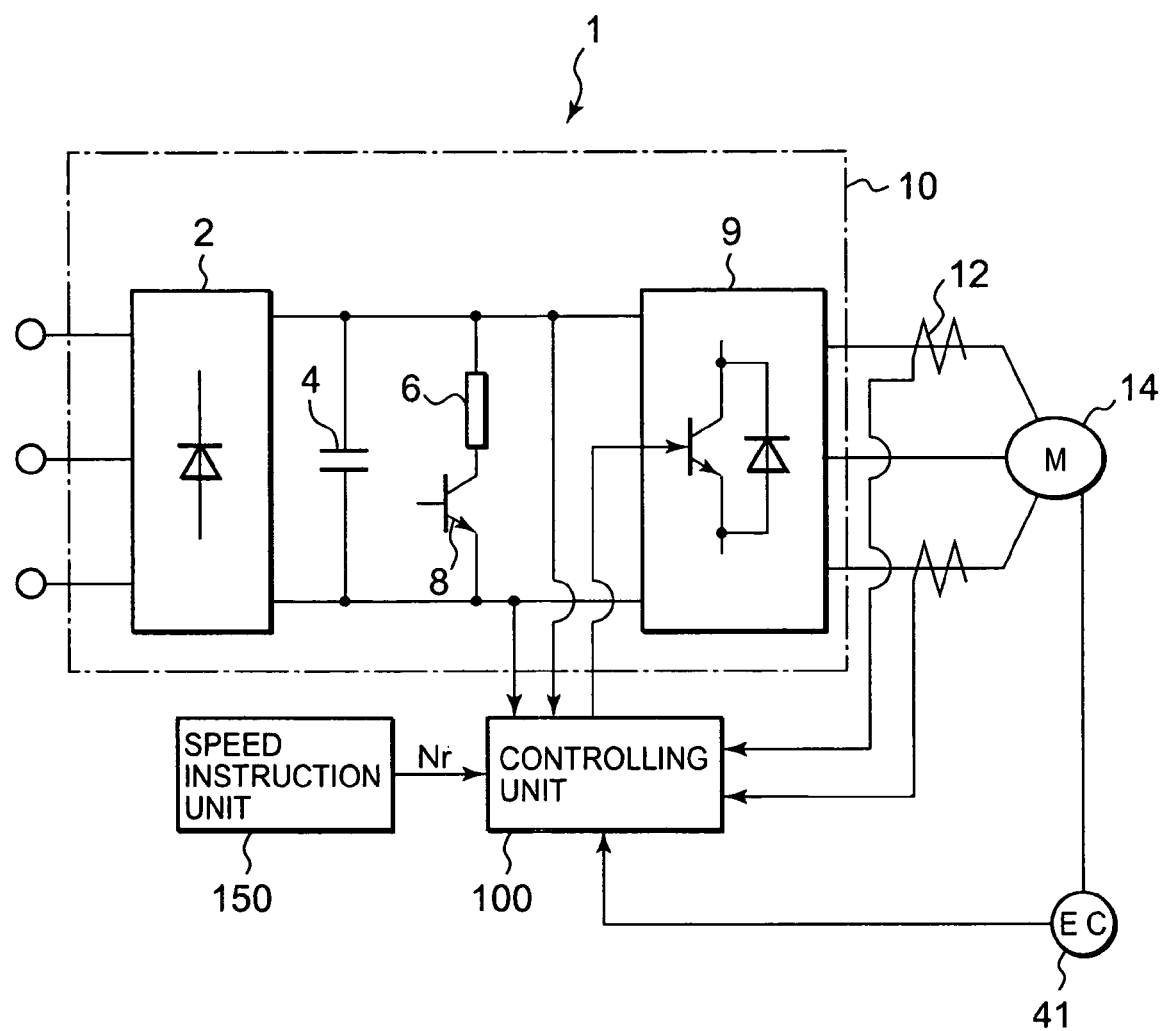
FIG. 1 is a block diagram illustrating an overall control device, for a permanent magnet synchronous motor, in an embodiment according to the present invention.
Figure 2:
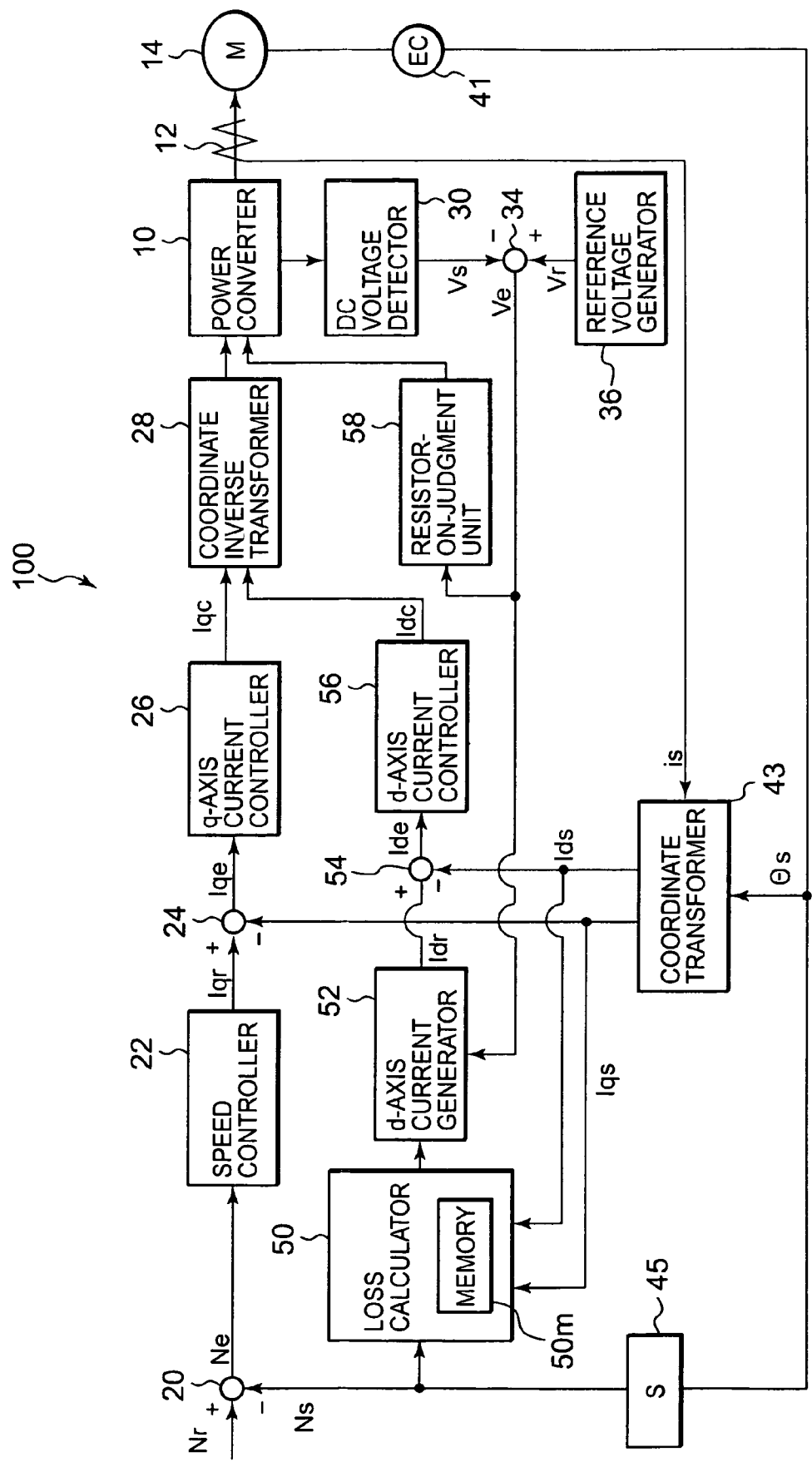
FIG. 2 is a block diagram centering on the controlling unit shown in FIG. 1.
Figure 3:
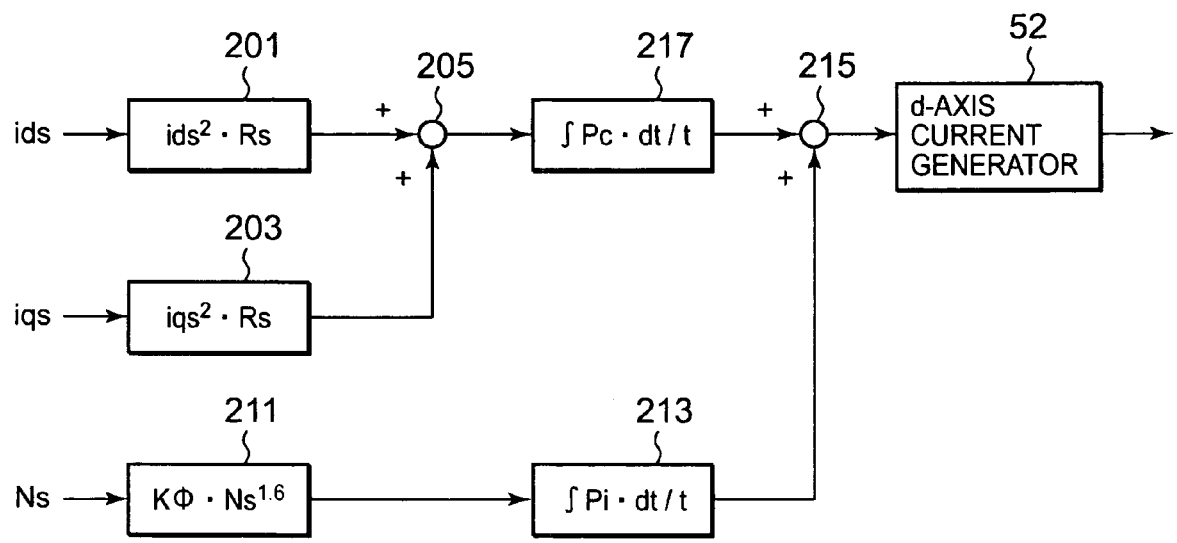
FIG. 3 is a detailed block diagram illustrating the loss calculator shown in FIG. 2.

An embodiment according to this invention is explained, using FIG. 1 through FIG. 3. FIG. 1 is a whole block diagram illustrating a control device for a permanent magnet synchronous motor, FIG. 2 is a detailed block diagram illustrating the controlling device shown in FIG. 1, and FIG. 3 is a detailed block diagram illustrating the loss calculator shown in FIG. 2.

In FIG. 1 through FIG. 3, the control device for the motor includes a power converter 10, a controlling unit 100, a current detector (a current detecting means) 12 that detects current flowing into a motor 14 and inputs into the controlling unit 100 a current detecting signal $i_s$, and an encoder 41 that detects the rotational position of the motor 14 and inputs into the controlling unit 100 the position detection signal $\theta_s$, and a speed instruction signal $N_r$, generated by a speed instruction unit 150, is inputted into the controlling unit 100.

The power converter 10 includes a converter 2 for converting three-phase AC voltage into DC voltage, a condenser 4 for smoothing the DC voltage that contains ripple voltage from the converter 2, an inverter 9 for converting the DC voltage into three-phase AC voltage so as to drive the motor 14, a resistor 6 that consumes recovering electric power, being generated by the motor 14 and stored into the condenser 4, through the inverter 9, and a transistor 8, as an on-off switching device, for on-off controlling current flowing into the resistor 6.

In FIG. 2, the controlling unit 100 includes: a differentiator 45 for differentiating a position detection signal $\theta_s$ outputted from the encoder 41 in order to obtain a speed detection signal $N_s$; a subtractor 20 for decreasing the speed instruction signal $N_r$ by the speed detection signal $N_s$ in order to obtain a speed deviation signal $N_e$; a speed controller 22 for obtaining a q-axis current instruction signal $i_{qr}$ from the inputted speed deviation signal $N_e$ in order to work as a q-axis current instructing means; a coordinate transformer 43 for obtaining a q-axis current detection signal $i_{qs}$ and a d-axis current detection signal $i_{ds}$, through coordinate transforming, from the position detection signal $\theta_s$ and the current detection signal $I_s$, respectively; a DC voltage detector 30 for generating a voltage detection signal $V_s$ after detecting DC voltage in the power converter 10 and applying to a subtractor 34 the voltage detection signal $V_s$; a reference voltage generator 36 for applying to the subtractor 34 a predetermined reference voltage signal $V_r$; and the subtractor 34 for generating a voltage deviation signal $V_e$ that is the deviation of voltage detection signal $V_s$ from the reference voltage signal $V_r$.

Furthermore, the controlling unit 100 includes: a subtractor 24 for generating a q-axis current deviation signal $i_{qe}$ that is the deviation of the q-axis current detection signal $i_{qs}$ from the q-axis current instruction signal $i_{qr}$ and; a q-axis current controller 26 for generating a q-axis current control signal $i_{qc}$ from the inputted q-axis current deviation signal $i_{qe}$; a loss calculator 50 for calculating a loss in the motor 14 by using the q-axis current detection signal $i_{qs}$, the d-axis current detection signal $i_{ds}$, and the speed detection signal $N_s$ as the motor's rotation speed; a d-axis current generator (a d-axis current generating means) 52 for calculating a d-axis current instruction signal $i_{dr}$, that is, allowable d-axis current to flow into the motor 14, by decreasing the motor's rated loss by the loss; a subtractor 54, working as a controlling means, for generating a d-axis deviation current signal $i_{de}$ by calculating the deviation of the d-axis current detection signal $I_{ds}$ from the d-axis current instruction signal $i_{dr}$; a d-axis current controller

56 for generating a d-axis current control signal $i_{dc}$ from the d-axis deviation current signal $i_{de}$; a coordinate inverse transformer 28 for generating three phase AC current instruction signals $i_{ur}$, $i_{vr}$, and $i_{wr}$ from the inputted q-axis current control signal $i_{qc}$ and the inputted d-axis current control signal $i_{dc}$.

Furthermore, the controlling unit 100 includes a resistor-on-judgment unit 58 that compares the voltage deviation signal (a voltage value) $V_e$ with a predetermined threshold value $V_z$, and, when the voltage deviation signal (a voltage value) $V_e$ is higher than $V_z$, decides that the recovering electric power could not be consumed up by the motor 14, so as to allow the resistor 6 to consume the recovering electric power by on/off controlling the transistor 8.

The loss calculator (the loss calculating means) 50 sums up copper loss $P_c(w)$, being generated in the motor windings, and iron loss $P_i(w)$, being generated in the iron-core of the motor, as the total loss $P_o(W)$ in the motor 14.

Although mechanical losses, such as a bearing's friction loss due to the motor's rotation, are generated, these losses are neglected because of their small quantity compared with the sum of the copper loss and the iron loss.

$$P_c = 3R_w I_p^2 = R_w(i_{ps}^2 + i_{ds}^2)$$

Here, $R_w$: the resistance of wound wire per phase ($\Omega$)
$I_p$: effective current per phase (A)

$$P_i = Kf\Phi^{1.6}$$

Here, K: field magnetic flux constant $f\Phi$: frequency of the magnetic flux (Hz)

$$f\Phi = pN/60$$

Here, P: the number of poles, N: rotation speed of the motor

The field magnetic flux constant K can be obtained by measuring a value of the $P_i$ inputted into the motor 14, rotated at the rated rotation speed $N_n$ with no loads, and then using the equation below.

$$K = (N_n/60P)^{1.6}/P_i$$

Following above explanations, after the field magnetic flux constant K and the resistance $R_w$ of the motor 14 are inputted in advance so as to be stored in a memory 50m as a storage means, the coordinate transformer 43 calculates the q-axis current control signal $i_{qs}$ and d-axis current control signal $i_{ds}$ by using the motor 14's rotation speed, detected by the encoder 41, and the motor 14's current, detected by the current detector 12; thereby, the loss calculator 50 can calculate the motor 14's total loss by using the q-axis current control signal $i_{qs}$, the d-axis current control signal $I_{ds}$, and the speed detection signal $N_s$.

As is shown in FIG. 3, the loss calculator 50 comprises: a d-axis copper loss calculator 201 for calculating a d-axis copper loss $P_d$ by multiplying the d-axis current detection signal $I_{ds}$ squared by the resistance $R_w$; a q-axis copper loss calculator 203 for calculating a q-axis copper loss $P_q$ by multiplying the q-axis current detection signal $i_{qs}$ squared by the resistance $R_w$; an adder 205 for calculating the total copper loss $P_c$ by adding the d-axis copper loss and q-axis copper loss together; an average copper loss calculator 217 for calculating the average copper loss $P_{cave}$ by dividing the time-integral of the total copper loss $P_c$, by the total time; an iron loss calculator 211 for calculating the iron loss $P_i$ by multiplying the motor 14's speed detection signal to the power of 1.6 by the constant $K\phi$; an average iron loss calculator 213 for calculating the average iron loss $P_{iave}$ by dividing the time-integral, for each of the intervals, by the total time; an adder 215 for inputting into a d-axis current generator 52 the total loss $P_{0ave}$, being the sum of the average copper loss $P_{cave}$ and the average iron loss $P_{iave}$.

Figure 4:
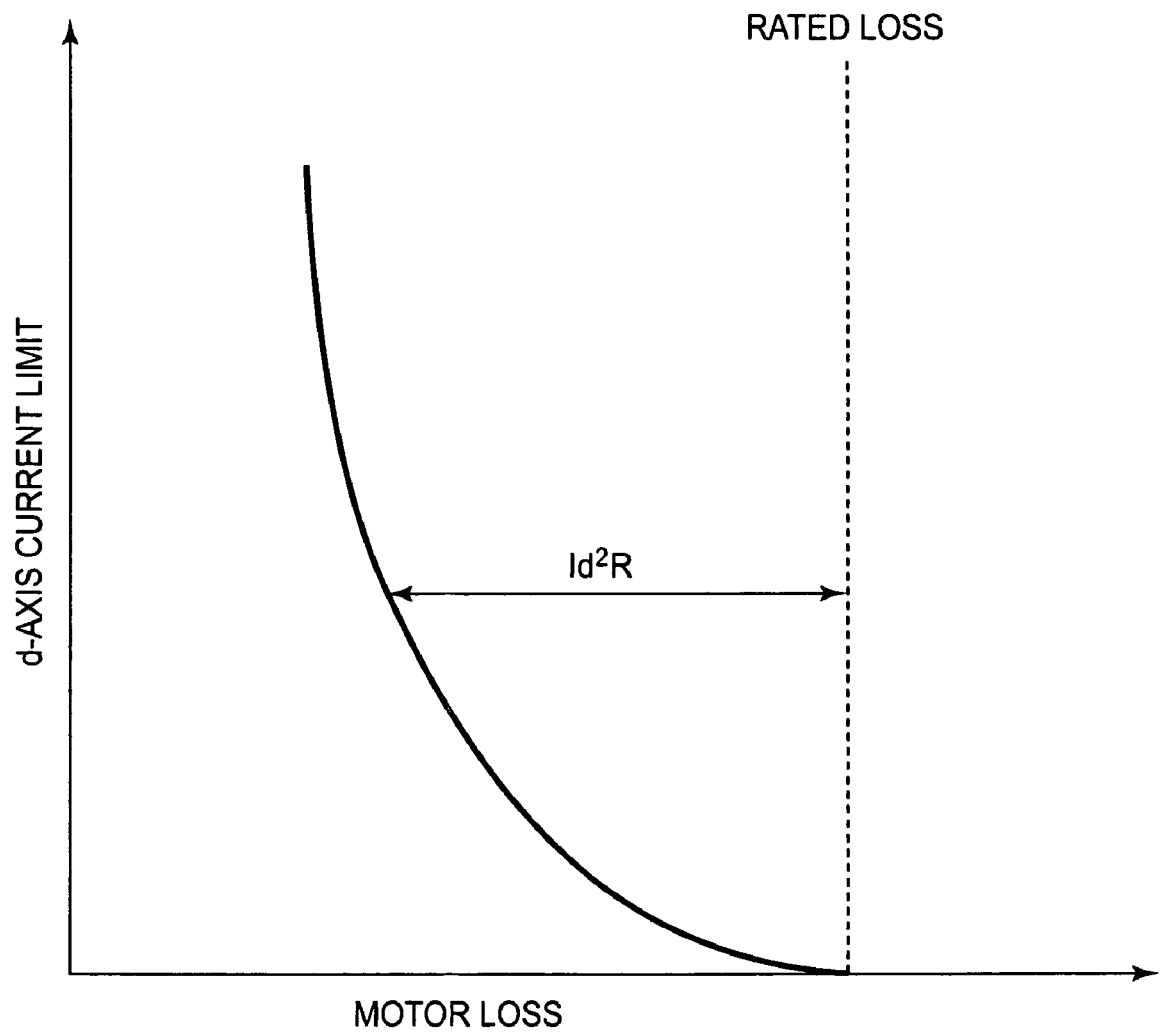
FIG. 4 is a characteristic curve of the d-axis current controller shown in FIG. 2.

As is illustrated in FIG. 4, the value that is the rated loss of the motor 14 decreased by the total loss of the motor 14 generating at the moment, gives an allowable loss in which the d-axis current can be flowed, by the d-axis current generator-52, into the motor 14. For this reason, the d-axis current generator 52 is configured to generate this value as the d-axis current instruction signal $i_{dr}$.

The rated loss of the motor 14 corresponds to a value in which inputted electric power (W) is measured, while the motor 14 generating the rated output (W), and then the inputted electric power (w) is decreased by the rated output of the motor 14. The rated loss as described above is obtained, for example, by experiments, and the loss is inputted into the memory 50m beforehand so as to store it as a value of the rated loss.

The operations of the control device for the motor configured as described above are explained below, using FIG. 1 through FIG. 3. First of all, the rated loss in the motor 14, the wound-wire resistance $R_s$ of the motor 14 per phase, and the field magnetic flux constant K are inputted so as to be stored in the memory 50m in the loss calculator 50.

When the motor 14 operates in a recovery state in accordance with the speed instruction signal $N_r$, recovering electric power is stored into the condenser 4 through the inverter 9. Thereby, DC voltage across the condenser 4 rises.

When the voltage detection signal $V_s$, being generated by the DC voltage detector 30, is inputted into the subtractor 34, and the reference voltage signal $V_r$, being generated by the reference voltage generator 36, is simultaneously inputted into the subtractor 34, the subtractor 34 inputs into the d-axis current generator 52 the voltage deviation signal $V_e$, being the deviation of the voltage detection signal $V_s$ from the reference voltage signal $V_r$. On the other hand, the current detector 12 detects current flowing into the motor 14, and generates a current detection signal $i_s$ so as to input it into the coordinate transformer 43, while the encoder 41 detects a motor 14's rotational position by the position detection signal $\theta_s$ and inputs it into both of the coordinate transformer 43 and the differentiator 45. The coordinate transformer 43 converts the current detection signal $i_s$ into the q-axis current detection signal $i_{qs}$ and the d-axis current detection signal $i_{ds}$, so as to input them into the loss calculator 50 as well as input the d-axis current detection signal $i_{ds}$ into the subtractor 54.

In the loss calculator 50, using the resistance $R_s$ of the motor 24 stored in the memory 50m, the q-axis copper loss calculator 201 calculates the q-axis copper loss from the q-axis current detection signal $i_{qs}$, and the d-axis copper loss calculator 203 calculates the d-axis copper loss from the d-axis current detection signal $i_{ds}$, so that both losses are inputted into the adder 205. The adder 205 calculates the total copper loss $P_c$, being the sum of the q-axis loss $P_q$ and the d-axis loss $P_d$, so as to input into the average copper loss calculator 217 the total loss. As is shown in FIG. 3, the average copper loss calculator 217 calculates the average copper loss $P_{cave}$ by dividing the time-integral of the total copper loss $P_c$ by the total time, so as to input into the adder 215 the average copper loss.

Meanwhile, the iron loss calculator 211 calculates the iron loss $P_i$ from the speed detection signal $N_s$ and the field magnetic flux constant K of the motor 24, being stored in the memory 50m, so as to input into the average iron loss calculator 213 the iron loss. The average iron loss calculator 213 calculates the average iron loss $P_{iave}$ by dividing time-integral of the iron loss $P_i$ by the total time, so as to input into the adder 215 the average iron loss. The adder 215 calculates the total loss $P_t$ by adding the average copper loss and the average iron loss together, so as to input into the d-axis current generator 52 the total loss.

As is illustrated in FIG. 4, the d-axis current generator 52 inputs into the subtractor 54, as the d-axis current instruction signal $i_{dr}$, the value of the rated loss decreased by the total loss. The subtractor 54 calculates the d-axis current deviation signal $i_{de}$, being the deviation of the d-axis current detection signal $i_{ds}$ from the d-axis current instruction signal $i_{dr}$, so as to input into the d-axis current controller 56 the deviation signal, so that the controller 56 inputs into the coordinate transformer 18 the d-axis current control signal $i_{dc}$.

Meanwhile, the subtractor 20 calculates the speed deviation signal $N_e$, being the deviation of the speed detection signal $N_s$ from the speed instruction signal $N_r$, so as to input into the speed controller 22 the speed deviation signal. The speed controller 22 inputs into the subtractor 24 the q-axis current instruction signal $i_{qr}$, and the coordinate transformer 43 inputs into the subtractor 24 the q-axis current detection signal $i_{qs}$. The subtractor 24 inputs into the q-axis current controller 26 the q-axis current deviation signal $i_{qe}$, being the deviation of the q-axis current detection current $i_{qs}$ from the q-axis current instruction signal $i_{qr}$. The q-axis current controller 26 inputs into the coordinate inverse transformer 28 the q-axis current control signal $i_{qc}$, and the transformer 28 inputs into the inverter 9 the three phase AC current instruction signals $i_{ur}$, $i_{vr}$, and $i_{wr}$. Thereby, the recovering electric power is consumed at the resistance of the motor 14 by allowing the d-axis current to flow into the motor 14.

When the recovering electric power in the motor 14 cannot be fully consumed at the internal resistor of the motor 14 with the power further increasing, the internal DC voltage of the inverter 9 rises and the voltage deviation signal $V_e$ is inputted into the resistor-on-judgment unit 58. The resistor-on-judgment unit 58 compares the voltage deviation signal $V_e$ with the threshold value $V_z$, and when the signal exceeds the threshold value $V_z$, the unit generates an on-off signal in order to consume the recovering electric power in the resistor 6 by on-off controlling the transistor 8.

The above-described operations allow the d-axis current to flow into the motor 14 within the rated output of the motor 14. Thereby, the recovering electric power can be consumed in the motor 14 while preventing the motor 14 from being overloaded.

And furthermore, when the recovering electric power cannot be fully consumed in the motor 14, the resistor 6 is controlled to consume the power. Consequently, the rated capacities of the resistor 6 and the transistor 8 can be small.

Embodiment 2

Figure 5:
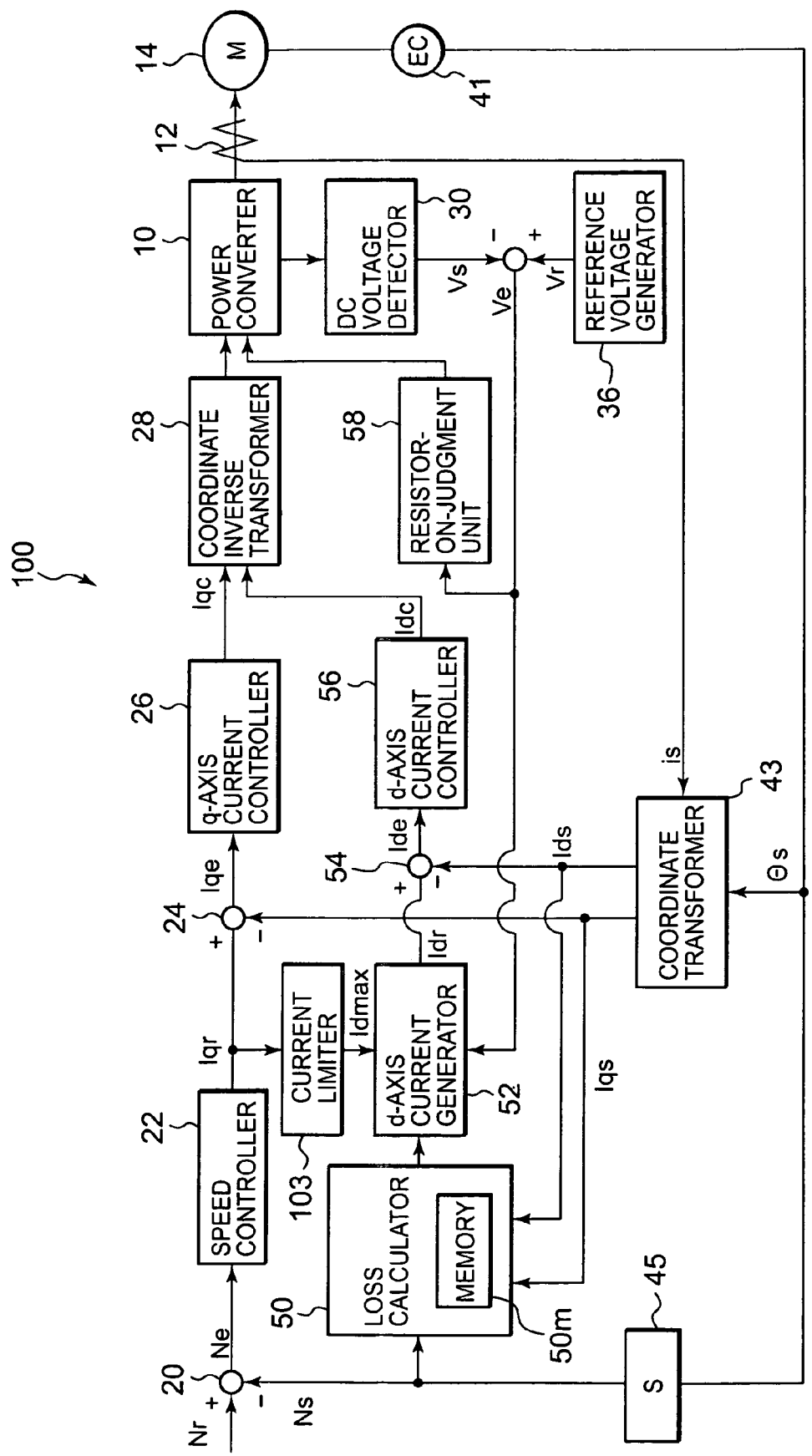
FIG. 5 is a block diagram centering on the controlling unit, shown in FIG. 1, in another embodiment according to the present invention.

Another aspect of an embodiment according to this invention is explained, using FIG. 5. FIG. 5 is a block, diagram illustrating an entire control device, for the motor, according to this aspect of the embodiment. In FIG. 5, the identical numerals with the ones in FIG. 2 refer to the identical parts, and those explanations are eliminated.

Given $I_n$ as the rated current of the transistor configuring the inverter 9, there is an relation between the q-axis current and the d-axis current that flow into the motor 14, as described below, $$I_n = (i_q^2 + i_d^2)^{1/2}$$

From the above equation, the maximum flowable d-axis current instruction signal $i_{dmax}$ is given below.

$$i_{dmax} = (I_n^2 + i_d^2)^{1/2}$$

As is shown in FIG. 5, a current limiter 103 that limits current in the d-axis current generator 52 is provided in order to prevent the d-axis current from exceeding the $i_{dmax}$.

Because the above-described control device for the motor is provided, so that current flows through the inverter 9 can be limited within the rated current of the transistor even if the d-axis current flows through the motor 14, over-current can be prevented from flowing through the inverter 9.

Embodiment 3

Figure 6:
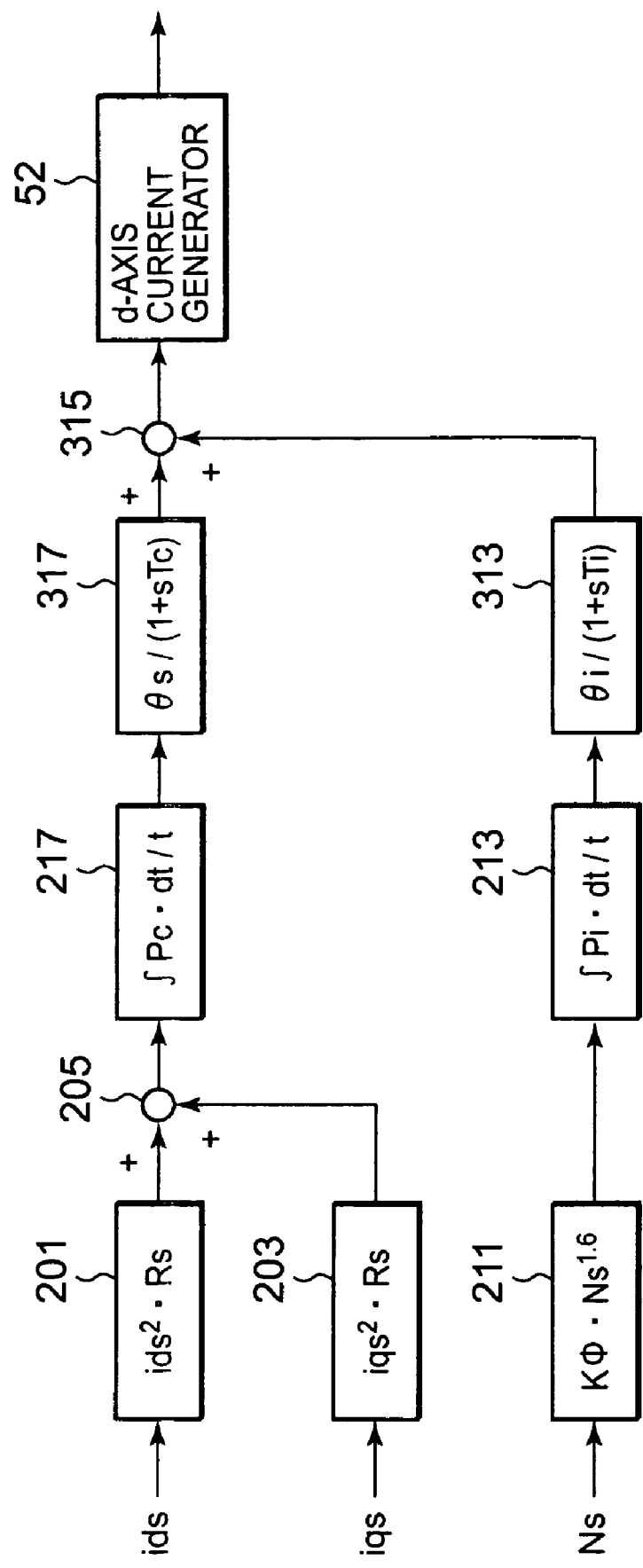
FIG. 6 is a block diagram for calculating temperature rise in the motor windings, in another embodiment according to the present invention.

Still another aspect of an embodiment according to this invention is explained, using FIG. 6. FIG. 6 is a block diagram for calculating temperature rise in the motor windings, according to this aspect of the embodiment. In FIG. 6, the identical numerals with the ones in FIG. 3 refer to the identical parts and those explanations are eliminated.

In FIG. 6, the functional block for calculating temperature rise in the motor 14 windings includes: a primary temperature estimator 317 for calculating to output temperature rise in the winding of the motor 14 itself from the inputted average copper loss $P_{cave}$, being outputted from the average copper loss calculator 217; a secondary estimator 313 for calculating temperature rise in the iron core of the motor 14 from the inputted average iron loss $P_{iave}$, being outputted from the average iron loss calculator 213; and an adder 315 for estimating temperature rise in the winding by adding the temperature rise in the winding itself and the iron core temperature rise; wherein the winding temperature rise is inputted into a d-axis current generator 52 in order to generate the d-axis current instruction signal $i_{dr}$. Here, the first temperature estimator 317, the second temperature estimator 313, and the adder 315 compose the estimating means.

INDUSTRIAL APPLICABILITY

As described above, a control device for a permanent magnet synchronous motor according to the present invention is applicable to fields of motor controlling.

What is claimed is:

1. A control device for a permanent magnet synchronous motor, comprising:

an inverter for converting input DC voltage into alternating current of variable voltage and variable frequency, and for driving the motor with the alternating current;

a q-axis current instructing means for generating, in accordance with a speed instruction signal, an instruction signal for a q-axis component of the current, orthogonal to the magnetic field of the motor;

a loss calculating means for calculating a loss that is the sum of the motor's copper loss and iron loss;

a d-axis current generating means for generating, in accordance with the motor's rated loss decreased by the loss, an instruction signal for a d-axis current that is passed through the motor;

a controlling means for judging, from the DC voltage, whether or not the motor is operating in a recovery state, and for activating the d-axis current generating means if the motor is in the recovery state.

2. A control device for a permanent magnet synchronous motor, comprising:
- an inverter for converting input DC voltage into alternating current of variable voltage and variable frequency, and for driving the motor with the alternating current;
- a q-axis current instructing means for generating, in accordance with a speed instruction signal, an instruction signal for a q-axis component of the current, orthogonal to the magnetic field of the motor;
- a storage means for storing inputted values of the motor's winding resistance, field magnetic flux constant, and rated loss;
- a current detecting means for detecting current flowing in the motor, so as to generate a current detection signal;
- a position detecting means for detecting a rotational position of the motor, so as to generate a position detection signal;
- a calculating means for calculating, based on the current detection signal and the winding resistance, the motor's copper loss, and calculating, based on the position detection signal and the field magnetic flux constant, the motor's iron loss, so as to calculate a loss that is the sum of the copper loss and the iron loss;
- a d-axis current generating means for generating, based on the motor's rated loss decreased by the loss calculated by the calculating means, an instruction signal for a d-axis current with the same directionality as the magnetic field of the motor; and
- a controlling means for judging, from the DC voltage, whether or not the motor is operating in a recovery state, and for activating the d-axis current generating means if the motor is in the recovery state.

3. A control device for a permanent magnet synchronous motor, comprising:
- an inverter for converting input DC voltage into alternating current of variable voltage and variable frequency, and for driving the motor with the alternating current;
- a q-axis current instructing means for generating, in accordance with a speed instruction signal, an instruction signal for a q-axis component of the current, orthogonal to the magnetic field of the motor;
- a storage means for storing inputted values for the motors winding resistance, field magnetic flux constant, rated loss, and thermal time constant;
- a current detecting means for detecting current flowing in the motor, so as to generate a current detection signal;
- a position detecting means for detecting rotational position of the motor, so as to generate a position detection signal;
- a loss calculating means for calculating, based on the current detection signal and the winding resistance, the motor's copper loss, and calculating, based on the position detection signal and the field magnetic flux constant, the motor's iron loss, so as to calculate a loss value that is the sum of the copper loss and the iron loss;
- an estimating means for estimating temperature rise in the motor windings based on the loss calculated by the loss calculating means, and on the thermal time constant;
- a d-axis current generating means for generating, in accordance with the estimated temperature rise, an instruction signal for flowing a d-axis current, with the same directionality as the magnetic field of the motor, to the motor; and
- a controlling means for judging, from the DC voltage, whether or not the motor is operating in a recovery state, and for activating the d-axis current generating means if motor is in the recovery state.

4. A permanent magnet synchronous motor control device according to any one of claims 2 to 3, wherein the inverter is provided with a d-axis current limiting means for restricting the d-axis current instruction signal based on the maximum current that the inverter is capable of flowing.

5. A permanent magnet synchronous motor control device according to any one of claims 2 to 3, wherein the control device further comprises:
- a recovery consumption means that includes a resistor and a switching device to be connected to the direct voltage; and
- an activating means that judges whether or not the direct voltage exceeds a predetermined threshold value, and activates the switching device when it exceeds the value.

6. The control device according to claim 1, wherein the loss calculating means comprises a memory that stores a field magnetic flux constant, a resistance value of the motor, and the rated loss of the motor, and wherein the loss calculating means calculates the loss based on the instruction signal for the q-axis component, the instruction signal for the d-axis current, and a speed detection signal.

* * * * *